B. E. ALLEGRETTI.
CANDY MAKING MACHINE.
APPLICATION FILED JUNE 20, 1919.

1,329,282.

Patented Jan. 27, 1920.
2 SHEETS—SHEET 1.

Witness:
F. L. Farrington

Inventor,
Benedetto E. Allegretti,
By Brown & Nissen
Attys.

B. E. ALLEGRETTI.
CANDY MAKING MACHINE.
APPLICATION FILED JUNE 20, 1919.
1,329,282.
Patented Jan. 27, 1920.
2 SHEETS—SHEET 2.
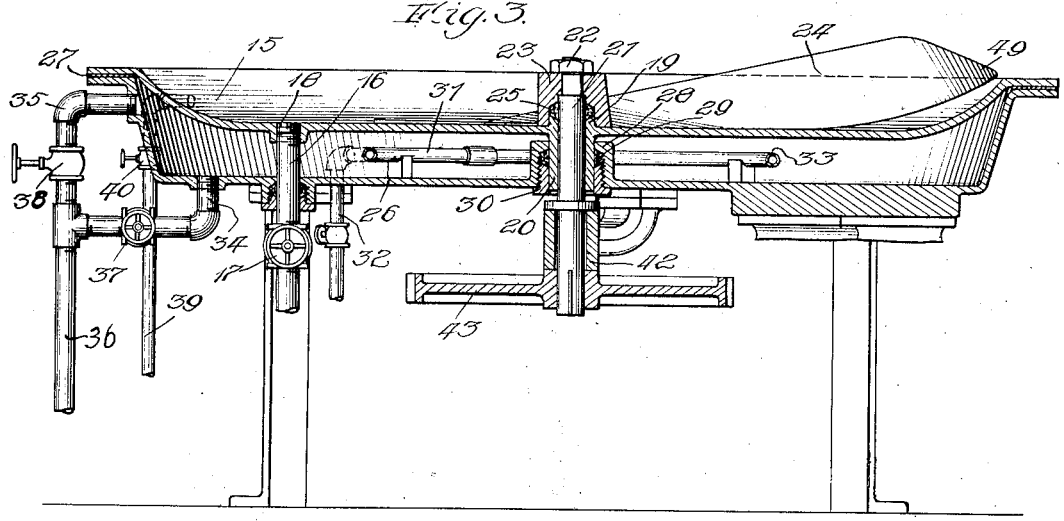
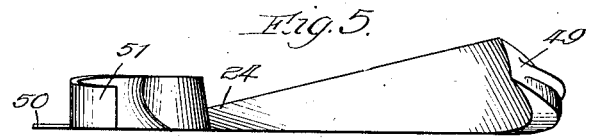
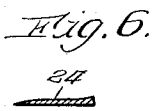
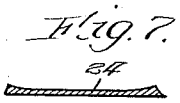
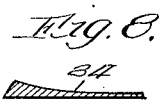
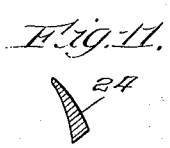
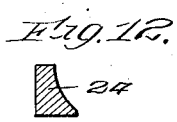
Inventor,
Benedetto E. Allegretti,
By Brown & Nissen
Attys.
Witness:
R. L. Parrington

UNITED STATES PATENT OFFICE.

BENEDETTO E. ALLEGRETTI, OF CHICAGO, ILLINOIS.

CANDY-MAKING MACHINE.

1,329,282.   Specification of Letters Patent.   Patented Jan. 27, 1920.

Application filed June 20, 1919. Serial No. 305,665.

*To all whom it may concern:*

Be it known that I, BENEDETTO E. ALLEGRETTI, a citizen of the United States, residing at Chicago, in the county of Cook and State of Illinois, have invented certain new and useful Improvements in Candy-Making Machines, of which the following is a specification.

My invention relates to candy-making machines and has for one of its objects the provision of a simple and efficient machine of the character mentioned in which the candy-making materials may be mixed, cooked, cooled and worked without removal therefrom.

A further object is the provision of a vessel fashioned to minimize drying and hardening of the candy while the latter is being cooked and worked.

A still further object is the provision of a vessel and stirring blade for candy-making machines in which the blade is adapted to quickly and efficiently work the candy-making materials into a homogeneous mass and at the same time mixing air into such mass.

Other objects will appear hereinafter.

An embodiment of my invention is shown in the accompanying drawings, forming a part of this specification, and in which—

Fig. 3 is a section taken on line 3—3 of Fig. 1.

Figure 1:
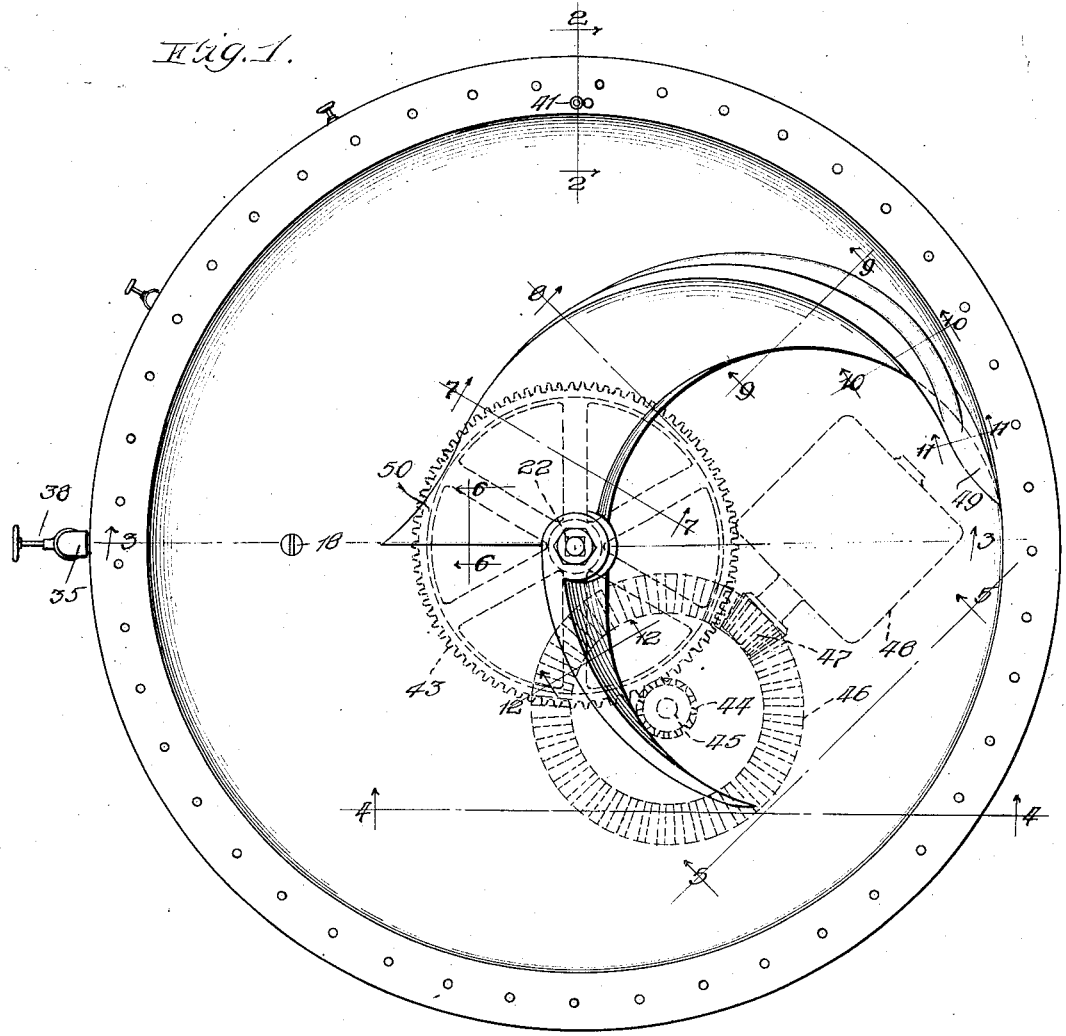
Figure 1 is a plan view of a candy-making machine embodying my invention.

Figs. 4 and 5 are side elevations of the stirring blade looking as from the lines 4—4 and 5—5, respectively, of Fig. 1; and Figs. 6, 7, 8, 9, 10, 11 and 12 are sections taken on lines 6—6, 7—7, 8—8, 9—9, 10—10, 11—11 and 12—12, respectively, of Fig. 1.

My invention is particularly adaptable for machines for making the creamy centers of chocolate creams, and the like. In the form of machine shown I have provided a shallow saucer-shaped vessel 15. I term the shape of this vessel as saucer-shaped for the reason that its bottom is substantially flat and its lateral walls curved outwardly and upwardly or flaring, thereby providing a vessel without vertical lateral walls and without any sharp corners at the juncture between the lateral walls and bottom. The advantages for such a construction will be set forth hereinafter.

The vessel 15 is provided with a discharge opening in which is preferably fitted a discharge pipe 16, and the latter is provided with a valve 17 to control the passage of materials from the vessel 15. In some instances it may be desirable to provide a plug 18 which is substantially flush with the inner surface of the vessel 15, as clearly indicated in Fig. 3. This plug prevents material from passing into the pipe 16, thereby preventing waste of any material which might accumulate in said pipe.

At the central portion of the vessel 15 I provide an upstanding extension 19 and a downwardly extending portion 20, with a vertical opening through said extensions and bottom of said vessel providing a journal for a vertical shaft 21. The upper end of the shaft 21 is provided with a non-round portion 22 which is engaged by the hub 23 of a stirring blade 24. The hub 23 is provided with a hollowed portion adapted to fit over the extension 19 and inclose a stuffing chamber 25. The chamber 25 is filled with any suitable packing material and provides a fluid-tight joint between the upper end of shaft 21 and the interior of the vessel 15.

Under the vessel 15 I provide a jacket 26 which has its peripheral edge secured to the peripheral edge of the vessel 15. There may be provided a gasket 27 between the adjacent edges of the vessel 15 and jacket 26 to insure a fluid-tight joint therebetween, when so desired. Screws, or their equivalent, may be used to secure the vessel 15 and jacket 26 together. At the central portion of the jacket 26 is an upstanding projection 28 having a hollowed out portion 29 which forms a packing chamber. The bore of the extension 28 is threaded and a follower 30 threaded therein so that packing material may be confined in the chamber 29, thereby providing a liquid-tight joint between the interior of the jacket 26 and the outside atmosphere.

In the space between the vessel 15 and jacket 26 I provide a cooling fluid distributer 31. In the present form this distributing member is circular, but I do not desire to be limited to any particular form of cooling fluid distributer. The distributer 31 is provided with a supply pipe 32 for conducting a suitable cooling fluid to the distributer 31. The distributer 31 is provided with openings 33 in its upper side in a manner to direct the cooling fluid against the bottom of the vessel 15, thereby providing means for quickly and efficiently cooling material in the vessel.

The jacket 26 is provided with a drain pipe 34 connected in its bottom, and an overflow pipe 35 connected in its upper side wall. These pipes 34 and 35 may be connected together into a waste pipe 36, or extended from the machine in any other desirable manner. The pipe 34 is preferably provided with a valve 37 to control the passage of fluids therethrough, and the pipe 35 is preferably provided with a valve 38 for controlling the passage of fluids through such pipe. It will be seen that with this arrangement the valve 38 can be opened to a desirable degree to control the height of fluids in the jacket 26, and the valve 37 may be opened to discharge any, or all parts of the fluid from said jacket.

A fluid-heating pipe 39 is connected with a suitable portion of the jacket 26 for the admission of steam, or other heating agent, to the space between the vessel 15 and jacket 26 so that materials may be cooked in the vessel 15 in the manufacture of candy. The pipe 39 is preferably provided with a valve 40 for controlling the admission of the heating agent to the jacket 26. I find that air has a tendency to pocket around the joint between the vessel 15 and jacket 26, and I have, therefore, provided a pet cock 41 in a position to permit this air to be driven out of the jacket. Also by permitting a small amount of steam to pass out into the atmosphere through the pet cock 41, I am able to get more efficient heating from the steam. This result, however, may be attained by closing the pet cock 41 and slightly opening the valve 38.

The shaft 21 extends downwardly through the jacket 26 and is journaled in a bearing 42 secured to the under side of said jacket. On the lower end of the shaft 21 is fixed a gear 43 which meshes with a pinion 44. Said pinion is fixed on a shaft 45 carrying a large beveled gear 46, and the latter is meshed with a pinion 47 carried on the shaft of a motor 48. This illustrates one means of providing operating means for said shaft, but it will be understood that other forms may be provided, when desired. The shaft 45 may be journaled in suitable bearings, and the motor 48 secured in a suitable manner to the under side of the jacket 26.

Figure 2:
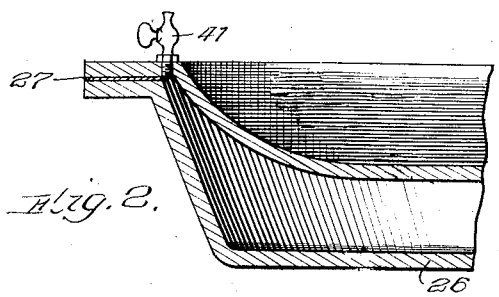
Fig. 2 is an enlarged fragmental section taken on line 2—2 of Fig. 1.

The high efficiency of my invention is largely due to the particular shape of the stirring blade 24. The stirring blade is adapted to rest on the bottom and side walls of the vessel 15 with a portion extending upwardly above the side walls sufficiently far to prevent the candy materials from rolling up over the blade. By providing the side walls substantially as indicated in Figs. 2 and 3 with the blade 24 extending slightly above the upper edge of the side walls, the candy materials are prevented from hardening on said side walls during the cooking and working of the candy. Furthermore, the blade is adapted to settle or move downwardly as it wears away in use, thereby providing a snug fit between the bottom and side walls of the vessel and blade at all times. This result would not be attained by having vertical side walls for the reason that when the blade wore in use, it would wear away from the vertical side walls.

In Figs. 4 to 11 it has been attempted to show the portion of the blade which moves the candy from the outer portion of the vessel toward the center thereof. In this movement of the candy the toe portion or outer end 49 of the blade is fashioned so as to throw the edge of the candy-making materials back into the pan, thereby preventing such materials from backing up in front of the blade or being thrown out over the edge of the vessel. The portion of the blade just back of the extreme toe portion is adapted to cause the candy material to roll and as such candy material rolls, it rolls around a quantity of air which is forced into the candy material by the candy material settling over the air. The blade portion adjacent the center is made more nearly flat, substantially as indicated in Figs. 7 and 8, so that as the candy material approaches the center of the vessel it rides on the flat portion 50 of the blade. The outer end 49, therefore, has a tendency to twist the candy and the portion 50 to hold it against turning, therefore, the candy is caused to twist through several revolutions between its passage from the outer edge of the vessel to the central portion thereof. The portion 51 of the blade is curved and adapted to catch the candy material as it passes from the portion 50 of the blade and moves such candy material from the central portion of the vessel to the outer edge portion thereof where it will again be caught by the portion 49 and moved again back across the central portion of the pan. In this movement the candy is quickly and efficiently worked into a homogeneous mass which has a considerable quantity of air beat into it forming a creamy mass.

The candy-making materials may be placed directly into the vessel 15 and mixed as much as desirable, then the steam or other heating agent, turned onto the jacket to cook the materials. After the materials have been sufficiently cooked, the steam, or other heating agent, is turned off from the jacket and the cooling agent turned on and directed by the member 31 against the bottom of the vessel 15 to cool such materials. When sufficient cooling has been had, the motor may be started to operate the blade to work the candy materials. It will, therefore, be seen that the candy-making materials may be mixed, cooked, cooled and worked without removal from the machine.

While I have illustrated and described the preferred form of my invention, I do not desire to be limited to the precise details, but desire to avail myself of such variations and changes as come within the scope of the appended claims.

I claim:—

1. A candy machine comprising a saucer-shaped vessel; a stirring blade mounted for rotary movement in the vessel and adapted for automatic adjustment toward the vessel to take up wear between the bottom and side walls of the vessel and said stirring blade; and operative means connected with the blade.

2. A candy machine comprising a shallow circular vessel having flaring lateral walls; a stirring blade mounted for rotary movement in said vessel, the vessel engaging portions of said blade conforming with the bottom and lateral walls of the vessel and extending from the center of the latter to a little above the top edge of the lateral walls of the vessel.

3. A candy machine comprising a shallow circular vessel; and a stirring blade pivoted at the center of and engaging the bottom and side walls of said vessel, one end portion of said blade being curved longitudinally with its candy material engaging surface curved laterally, the outer part of said surface being generally upright and the part of said surface adjacent the pivot of the blade being generally horizontal and extending laterally away from said pivot.

4. A candy machine comprising a circular vessel; a stirring blade pivoted at its central portion at the axis of the vessel, one end portion of the blade being substantially spiral in form and adapted to move material from the edges of the vessel to the central portion of the latter and twist said material during such movement, and the other end portion of the blade being curved and adapted to move material from the central part of the vessel to the edges of the latter, there being a thin horizontal portion adjacent the pivot of the blade extending laterally a considerable distance in the path of the second-mentioned end portion; and means for imparting rotary movement to the blade.

5. A candy machine comprising a circular vessel; a stirring blade pivoted at its central portion at the axis of the vessel, one end portion of the blade being curved and adapted to move material from the edges of the vessel to the central portion of the latter and the other end portion of the blade being curved and adapted to move material from the central portion of the vessel to the edges of the latter; and a lateral extension on the blade adjacent its central portion adapted to facilitate moving material from one end portion to the other end portion of said blade.

6. A candy machine comprising a stirring blade having a central hub and two arms extending spirally from said hub, the candy-engaging surface of one arm being curved laterally with the outer end portion substantially vertical and its inner end portion substantially horizontal, and the candy-engaging surface of the other arm being substantially vertical throughout its length.

7. A candy machine comprising a circular vessel; a stirring blade pivoted at its central portion at the axis of the vessel, the end portions of the blade being curved toward each other and extending toward the periphery of the vessel; and a horizontally disposed part disposed laterally from the central portion of the blade adjacent the pivotal point of the latter.

8. A candy machine comprising a circular vessel; a vertical shaft pivoted axially of the vessel; a hub on the upper end of the shaft; a blade comprising two arms extending from the hub and resting on the vessel, said arms being curved toward each other and one of the arms being spiral in form adapted to exert a twisting force on material engaged thereby; and a horizontally disposed portion adjacent the hub on the first-mentioned arm adapted to facilitate passing materials by said hub.

9. A candy machine comprising a shallow circular vessel having flaring lateral walls; and a stirring blade pivoted at the center of the vessel with one end portion having one edge conforming to and engaging the bottom and lateral walls of the vessel and its other edge disposed above the vessel adjacent the periphery of the latter and on the bottom of the vessel adjacent the pivot of said blade.

10. A candy machine comprising a shallow pan having flaring side walls; a hub pivoted at the center of said pan; two arms extending spirally in opposite directions from said hub, one edge of one of said arms engaging the bottom of said pan and one edge of the other arm engaging the bottom and side walls of said pan, the other edge of the last-mentioned arm adjacent the periphery of the pan being disposed a considerable distance above said pan and adjacent said hub disposed on the bottom of the pan a considerable distance from said hub; and means for imparting motion to said hub.

In testimony whereof I have signed my name to this specification on this 18th day of June, A. D. 1919.

BENEDETTO E. ALLEGRETTI.